Patented Feb. 23, 1943

2,311,831

UNITED STATES PATENT OFFICE 2,311,831

MOISTUREPROOFING COATING COMPOSITION

George Samuel Heaven, Chedzoy, Bridgewater, Somerset, and William Berry, Bridgewater, Somerset, England, assignors to E. I. du Pont de Nemours & Company, Wilmington, Del., a corporation of Delaware No Drawing. Application March 1, 1940, Serial No. 321,786. In Great Britain March 7, 1939

2 Claims. (Cl. 260—16)

The present invention relates to improvements in or relating to the manufacture, production and use of chemical compounds which can be used as combined blending agents and plasticizers, especially in lacquers.

The present invention comprises in one aspect a process for the production of combined blending agents and plasticizers which process is characterized by effecting substantial condensation of one or more resins with one or more plasticizers of the ester type. By the term as used throughout this specification, "plasticizer of the ester type" is meant a plasticizer for nitrocellulose (also organic acid cellulose esters and cellulose ethers), which is itself an ester.

We have found that new products (chemical compounds) are obtained by the condensation of resins with plasticizers of the ester type.

The products obtained by the condensation of the resins with plasticizers of the ester type have been found to be extremely suitable for use in lacquers and coating compositions which are of use in the arts.

Accordingly, the invention comprises in another aspect a coating composition free from cellulose derivatives, or a nitro-cellulose lacquer, in which coating composition or nitro-cellulose lacquer one or more resins and one or more plasticizers of the ester type are employed as blending agents and plasticizers, and which coating composition or lacquer is characterized by the fact that the resin or resins and plasticizer or plasticizers of the ester-type are present in substantial quantity in the form of their mutual condensation product.

If a wax or the like, for example paraffin wax, is included in the coating compositions or lacquers as set forth in the preceding paragraph, coating compositions or lacquers may be obtained which have been found to be extremely suitable for use for moisture-proofing regenerated cellulose sheets and films.

In the production of the combined blending agents and plasticizers according to the invention, the most varied types of resins appear to be suitable for use as a component in this condensation yielding products the properties of which depend to some extent upon the particular resin used. Useful products have been obtained by the condensation of plasticizers of the ester type with natural resins such as gum damar, with modified natural resins such as ester gum, and with artificial (synthetic) resins of, for example, the sulphonamide-aldehyde, the polybasic acid-polyhydric alcohol, and the polymerized hydrocarbon types. Not all resins are equally suitable for use, however, as a component in the condensation. As the plasticizer component, phthalates, e. g. dibutyl phthalate, and phosphates, e. g. tricresyl phosphate, are particularly advantageous. In some cases it may be advantageous to cause more than one resin and/or more than one plasticizer of the ester type to take part in the condensation reaction.

The condensation is carried out by heating the mixtures of resin and plasticizer together for a considerable period of time. The heating may be carried out in air, oxygen, or nitrogen at atmospheric pressure. An increase or reduction of pressure gives no advantage. The duration of the heating depends upon the temperature. If a moderate temperature is used, e. g. 100° C., the time required is normally about 48 hours; but if the temperature is higher, the time required is shorter.

The duration of the heating in any given case has a critical value, in the sense that if the duration of the heating is either too short or too long, products are obtained which, when used as an ingredient in lacquers as described hereinafter, yield coatings having inferior properties, e. g. in respect of strength of mutual heat-seal and of anchorage to the base, compared with the corresponding properties of similar coatings in which the ingredient obtained by heating for either too short or too long duration is replaced by the condensation product obtained by heating for the optimum duration in the given case. Excessively prolonged heating also tends to diminish the resistance of the dried lacquer coatings to the passage of moisture vapor.

The formation of the condensation product is accompanied by a change in the physical properties of the mixture, for example in its solubility in various solvents, e. g. aqueous alcohol, and by a darkening of the melt, and the progress of the condensation reaction in any given case and under given conditions may be followed by making a series of measurements at successive intervals of time of a convenient physical property of the melt or of a lacquer containing as an ingredient the product of the melt.

The following examples, in which the proportions are given in parts by weight, will serve to illustrate how the invention is carried out in practice, but the invention is not limited to these examples.

Example I

One (1) part of gum damar was heated, with stirring, in an open vessel, with 3 parts of dibutyl phthalate at 200° C. for 6 hours.

Example II

One (1) part of ester gum was heated, with stirring, in an open vessel with 3 parts of tricresyl phosphate at 100° C. for 48 hours.

Example III

One (1) part of alkyd resin was heated, with stirring, in an open vessel with 3 parts of dibutyl phthalate at 100° C. for 48 hours.

Example IV

One-half (½) part of ester gum and ½ part of gum damar were heated together, with stirring, in an open vessel with 2 parts of dibutyl phthalate and 1 part of tricresyl phosphate at 100° C. for 48 hours.

The condensation may also be carried out by heating the components, dissolved in a common solvent or solvent mixture, for a period of time dependent, as before, on the temperature. If desired, nitro-cellulose and/or wax or the like, e. g. paraffin wax, may also be present in the solution during the heating, for example in the proportions in which they normally occur in a lacquer; neither the nitro-cellulose nor the wax or the like appears to take any part in the condensation.

According to the present invention a lacquer (and process of producing same) comprising nitro-cellulose (or other cellulose substitution derivative) and a wax or the like, wherein one or more resins and one or more plasticizers of the ester type are employed as blending and plasticizing constituents, is characterized by the fact that the resin or resins and a plasticizer or plasticizers of the ester type (ester or esters) are employed in a substantial quantity in the form of their mutual condensation products. The condensation products may be formed by heating the resins and plasticizers of the ester type together as above described, either separately from or in the presence of the other constituents of the lacquer. The optimum period of heating, in the case of a solution heated to the temperature, e. g. 40° C., at which such compositions are commonly applied to a base, amounts to many days.

The products obtained by the condensation of resins with plasticizers of the ester type have been found to be particularly useful as ingredients in admixture with paraffin wax and in some cases also with nitro-cellulose in the production of coating compositions and lacquers, particularly for moisture-proofing regenerated cellulose sheet or film.

Accordingly the invention comprises in another aspect a moistureproofing lacquer comprising in the proportions hereinafter stated nitro-cellulose (or other cellulose substitution derivative), a wax or the like, a resin and a plasticizer of the ester type, wherein the resin and the plasticizer of the ester type are employed as blending and plasticizer constituents, characterized by the fact that the resin and the plasticizer of the ester type are present in the lacquer in substantial quantity in the form of their mutual condensation product.

According to a further aspect, the invention comprises a moistureproofing coating composition free from cellulose derivatives and comprising in the proportions stated hereinafter a wax or the like, a resin and a plasticizer of the ester type, wherein the resin and the plasticizer of the ester type are employed as blending and plasticizer constituents, characterized by the fact that the resin and the plasticizer of the ester type are present in the coating composition in substantial quantity in the form of their mutual condensation product.

According to yet a further aspect, the invention comprises a process for producing moisture-proof regenerated cellulose sheets or films, which includes the employment as a coating composition of a moisture-proofing coating composition or of a moisture-proofing lacquer as set forth in the next two preceding paragraphs.

The proportions, with respect to each other, of the constituents of a lacquer comprising nitrocellulose and a wax or the like are to lie within the following ranges, the proportions being by weight, and the resin and the plasticizer of the ester type being present in a substantial quantity in the form of their mutual condensation product:

| | Parts |
|---|---|
| Nitrocellulose | 30 to 70 |
| Wax or the like | 2 to 8 |
| Resin | 10 to 35 |
| Plasticizer of the ester type | 10 to 35 |

A nitro-cellulose of the pyroxylin type is preferably employed. For the wax, it is preferred to employ paraffin wax, other waxes which may be used being ceresin wax and beeswax; the wax-like bodies which have already been proposed for use in the art, may be employed.

The following is an example of a lacquer according to the invention.

Example V

| | Parts |
|---|---|
| Nitro-cellulose | 40 |
| Paraffin wax | 2 |
| Ethyl acetate | 400 |
| Toluene | 160 |
| Glyptal (alkyd) resin | 10 |
| Dibutyl phthalate | 30 | were heated together at 40° C. with stirring for 15 days.

If desired, the cellulose derivative may be omitted from the lacquer, whereby a coating composition free from cellulose derivatives and comprising a wax or the like according to the invention is obtained. For the coating composition free from cellulose derivatives and comprising a wax or the like according to the invention, the proportions by weight of the wax, resin and plasticizer of the ester type with respect to each other are to lie within the following ranges, the resin and the plasticizer of the ester type being present in a substantial quantity in the form of their mutual condensation product:

| | Parts |
|---|---|
| Wax or the like | 2 to 15 |
| Resin | 30 to 80 |
| Plasticizer of the ester type | 10 to 40 |

In determining the ingredients of the coating composition or lacquer in accordance with the invention, the nature and proportion of any one ingredient must be chosen with respect to the nature and proportion of each of the other ingredients. Compositions comprising the above ingredients used in suitably chosen proportions, when dissolved in appropriate solvents and applied as a thin coating to a transparent regenerated cellulose sheet or film base, yield after evaporation of the solvent under known controlled conditions a coated regenerated cellulose sheet or film which is not only moisture-proof but which is also flexible without cracking, clearly transparent, and free from greasiness and tackiness.

Sheets or films of regenerated cellulose coated with a composition comprising a cellulosic base, such as a cellulose ether or ester and more particularly a nitro-cellulose of the pyroxylin type, a gum or a resin, a wax or the like and preferably a plasticizer, whereby the said sheets of regenerated cellulose are rendered substantially moisture-proof (in the sense used therein) while retaining flexibility and transparency, are described in U. S. A. Patent 1,737,187 (British Patent Specification No. 283,109).

A transparent base, such as a sheet or film of regenerated cellulose or cellulose derivative, or sheet or film of albuminous material, having a surface coating formed of a composition free from cellulose derivatives and comprising a resin and a wax or wax-like substance, and in some cases also a plasticizer, in proportions sufficient to render said base moisture-proof (in the sense used therein) and provide a non-tacky, non-greasy and transparent material, is described in U. S. A. Patent 2,147,629 (British Patent Specification No. 380,483).

No reference is made, however, in either of the above-mentioned prior specifications of the possibility of effecting substantial condensation of one or more resins with one or more plasticizers of the ester type, nor of the use of the products obtained by this condensation.

The technique of the selection of the ingredients of the moisture-proofing coating compositions free from cellulose derivatives and comprising wax or the like, and of the moisture-proofing lacquers comprising nitro-cellulose and a wax or the like, of the invention, and of the relative mutual proportions of the ingredients, and also of the process of the application of the coating to the regenerated cellulose film base, is similar to that described in aforementioned patent specifications.

It is known that sheets or films of regenerated cellulose may be rendered moisture-proof and moisture-resistant by coating them with a composition comprising in its preferred form, in admixture, a cellulose derivative, a wax or wax-like material, a gum or resin and a plasticizer. Sheets or films of regenerated cellulose and the like (such as low substituted cellulose ethers) coated with such a composition may be employed as wrapping materials for produce or goods which it is desired to maintain in substantially the original fresh condition without change in moisture content. When such coated material is used as a wrapping material to be held in direct contact with produce or goods having a high water content, such as wet or frozen fish, ice-cream, butter or cheese, it is found that the moisture resistant coating tends to loosen or flake off from the sheet of regenerated cellulose, whereby the moisture-proof and moisture-resistant quality of the wrapping material is impaired. Numerous efforts have been made to overcome this disadvantageous property of such lacquered films. These have included inter alia the use of an intermediate coating to anchor the moisture-resistant coating to the regenerated cellulose base, with an undesirable increase in the cost of the final product.

It is further known that, by a suitable selection of the ingredients of the coating composition (moisture-proofing lacquer) and of their proportions in the coating, moisture-resistant (moisture-proof) sheets and films of the type hereinabove referred to are obtained which may be mutually sealed by the application of heat and pressure, forming a strong joint.

It has now been found that when the combined blending agents and plasticizers formed in accordance with the invention by the condensation of resins with plasticizers of the ester type, are employed in admixture with a wax or the like and nitro-cellulose, as moisture-proofing compositions, they replace, wholly or in part, with advantage the gum or resin and the plasticizer in the coating compositions of the known type.

One of the advantages of employing, as moisture-proofing compositions for sheets and films of regenerated cellulose, compositions comprising as an ingredient the condensation products of the resins and plasticizers of the ester type, is that the moisture-proofing coating shows, compared with like known moisture-proofing coatings, enhanced heat-sealing properties, whereby stronger joints may be obtained between the so coated sheets and films by the application of heat and pressure under practical working conditions in use in the art.

A further advantage is that the moisture-proofing coating, in comparison with like known moisture-proofing coatings, shows improved anchorage to the regenerated cellulose film base, whereby the moisture-proofing coating resists the tendency to loosen or flake off from the film base even in cases of prolonged direct contact with water, and without the interposition of an anchoring layer between the moisture-proofing coating and the base.

*Example VI*

The lacquer of Example V was applied in a uniform, thin layer to a regenerated cellulose film base, and the lacquered film was dried in the known way to form a coated film, which was moisture-proof. The strength of the heat-seal bond, determined by the method hereinafter described, between two strips of the so coated film was approximately twice that of the heat-seal bond between two strips of like coated film, the coating of which, however, contains the uncombined resin and plasticizer in the same proportions but substantially none of the product formed by condensation of the alkyd resin component and the dibutyl phthalate component. The strength of the anchorage to the film-base of the moisture-proof coating containing as an ingredient the condensation product, as measured by the time of immersion, in hot and cold water respectively, required to detach the moisture-proof coating from the film base, showed a three-fold and five-fold increase respectively, compared with that of a similar moisture-proof coating but in which the alkyd resin and dibutyl phthalate, though present in like proportions, have undergone substantially no mutual condensation.

For the purpose of comparison and definition the following test has been used to measure the strength of the heat-seal bond. Two strips of the coated material 1½ inches wide are superposed one on the other so that opposite faces of the film are in contact. A seal is made across the width of the material at one end by placing the film on a metal plate heated to 130° C. and rolling thereover a roller ¾ inch wide weighted to 700 grams. The two strips so sealed are opened at the free ends. One of the free ends is gripped in a suitable clamp so that the sealed strip hangs freely, and a gradually increasing weight is applied at the other free end, until the strips are pulled apart at the sealed joint. The weight in grams required to pull the strips apart at the sealed joint is taken as the measure of the heat-seal bond strength.

It has been found that coatings, in which the resin component has been chemically condensed with the ester-plasticizer component, show a heat seal strength from about 1½ to about 4 times greater, dependent upon the nature of the components of the condensation, than that of like coatings in which the whole of the resin component and of the ester-plasticizer component are present in like proportions but have undergone no mutual condensation.

By the expression "moisture-proof regenerated cellulose sheet or film" is meant coated regenerated cellulose sheet which permits the passage of not more than 1000 grams of water vapour per 100 square meters per hour over a period of 24 hours at 39.5° C., the relative humidity of the atmosphere on one side of the sheet or film being maintained at least at 98% and the relative humidity of the atmosphere on the other side of the film or sheet being maintained at such a value as to give a humidity differential of at least 95%. The moisture-proofing terminology is defined in detail in U. S. A. Patent 2,147,180 (Ubben).

While the use of the moisture-proofing compositions and lacquers, containing as one ingredient the condensation product of resins and plasticizers of the ester type, has been described with reference to the coating of sheets and films of regenerated cellulose and other products obtained by precipitation, recovery or coagulation from an aqueous or aqueous-alkali solution, whereby the latter are rendered moisture-proof, the moisture-proofing compositions and lacquers may also be used with advantage for the coating of other solid materials, including films and sheets of gelatine and other protein material, chlorinated rubber, rubber hydrochloride, Pliolite (J. I. E. C. XXVI 125), cellulose derivatives such as cellulose esters (organic solvent soluble cellulose acetate, etc.) and ethers (organic solvent soluble ethyl cellulose, etc.), and rubber derivatives.

As many apparently widely different embodiments of this invention may be made without departing from the spirit and scope thereof, it is to be understood that this invention is not limited to the specific embodiments thereof except as defined in the appended claims.

Having now particularly described and ascertained the nature of our said invention and in what manner the same is to be performed, we declare that what we claim is:

1. A process for the production of a coating composition adapted to moistureproof regenerated cellulose sheet, which comprises heating

| | Parts |
|---|---|
| Nitrocellulose | 40 |
| Paraffin wax | 2 |
| Ethyl acetate | 400 |
| Toluene | 160 |
| Alkyd resin | 10 |
| Dibutyl phthalate | 30 | for 15 days at 40° C. with stirring.

2. A moistureproof coating composition obtained by heating

| | Parts |
|---|---|
| Nitrocellulose | 40 |
| Paraffin wax | 2 |
| Ethyl acetate | 400 |
| Toluene | 160 |
| Alkyd resin | 10 |
| Dibutyl phthalate | 30 | for 15 days at 40° C. with stirring.

GEORGE S. HEAVEN.
WILLIAM BERRY.